Patented Oct. 2, 1928.

1,686,207

UNITED STATES PATENT OFFICE.

HENNING GUSTAV FLODIN, OF ROSLAGS-NASBY, AND EMIL GUSTAF TORVALD GUSTAFSSON, OF STOCKHOLM, SWEDEN, ASSIGNORS TO HAMPUS GUSTAF EMRIK CORNELIUS, OF STOCKHOLM, SWEDEN.

DIRECT REDUCTION PROCESS FOR PRODUCING CARBON BINDING METALS OR METAL ALLOYS.

No Drawing. Application filed April 7, 1925, Serial No. 21,412, and in Sweden November 27, 1924.

The present invention refers to reduction processes for producing carbon binding metals or metal alloys, such as iron or iron alloys in an electric furnace, directly out of their oxide ores, with the use of carbon as a reducing agent, which carbon may, if desired, be partly replaced by other reducing agents, such as ferro-silicon, ferro-manganese or aluminum, the quantity of such thermic reducing agent being, however, proportioned in such manner that the process as such is endothermic.

The main object of the invention is to provide a reduction process for producing carbon binding metal or metal alloy, directly out of oxide ore, which process permits an exact control of the temperature in the furnace during reduction and melting and during tapping of the metal.

In order to attain this object, the invention consists in charging an electric furnace, having an electrode or electrodes that can be raised or lowered, and in which heat is thus developed by electric resistance in the slag bath with a mixture containing oxide ore and carbon in the proportion required for reduction of the ore and carbonization of the metal, reducing and melting said mixture mainly on the surface and in the upper portion of the slag bath, supplying the heat, optionally and as required, to the slag bath and the molten metal and by controlling the amount of heat supplied to different layers of the slag bath by regulating the position of the electrode or electrodes relatively the slag bath.

Preferably, said mixture has the form of solidified pieces or briquettes which are fed continuously or intermittently onto the slag bath within the furnace, the feeding being effected in such manner, that the charge will be distributed as uniformly as possible over the slag bath.

As stated above, one of the advantages of the process according to the invention is, that the temperature may in every part of the furnace be controlled as required for the various operations. For instance, when reducing the metal oxides in the charge, the furnace should preferably be operated with an arc between the electrode or electrodes and the slag bath, or with the electrode or electrodes practically contact with the same, the heat being then supplied principally to the upper surface of the slag bath or to the upper portion thereof, where the reduction and the melting take place and where, consequently, the need for heat is the greatest.

During reduction the heat may be controlled by adjusting the electrode or electrodes in relation to the slag bath from a distance in the beginning to practically a contact at the end of the reduction and running an arc between the electrode or electrodes and the slag bath. The method of supplying the heat in this manner also entails the advantage that the electrodes are not at all, or only to a very limited extent, brought into contact with the slag and the charge, whereby carbonization of the reduced metal through the carbon of the electrodes, as also too pronounced a corrosion of the electrodes by the metal oxides in the slag is prevented. Before the metal is to be tapped from the furnace, it is of advantage, however, in order to attain a sufficiently high temperature in the metal, to operate the furnace for an adequate length of time with the electrodes immersed into the slag as far as possible, that is to say, approaching the metal bath as much as possible without coming into contact with same. The real development of heat in the furnace is then taking place in the slag layer adjacent the metal bath, whereby the temperature of the metal lying in contact with this layer of slag is increased. The voltage of the electrode or electrodes should in this case be kept lower than during reduction as the resistance of the slag is decreased by the electrodes being sunk further down into the slag bath. Thus, in order that the same energy may be supplied to the furnace all the time, the electrical equipment of the furnace should be so devised that, when the voltage is lower, a correspondingly larger amperage may be supplied to the furnace.

During reduction the charge is preferably fed into the furnace continuously or at not too great intervals. An increase of the temperature of the metal at the bottom of the furnace may then also be effected when operated either with an arc or with a resistance, as described above, by cutting off feeding of the charge into the furnace for a suitable length of time. The furnace will, with the charge cut off, however, be less strained when running with a resistance, as the temperature in the upper portion of the furnace will be lower than when running with an arc.

After the metal has been brought, some way or other, to a temperature suitable for tapping, it is in many cases preferred, when using sulphurous raw material in the charge, to desulphurize and, perhaps also to dephosphorize the metal in known manner, prior to tapping, with a slag rich in lime, especially prepared by means of burnt lime, carbon and fluorspar, after the slag from the reduction period has been wholly or partly, removed from the furnace. During the desulphuration the furnace is in known manner operated with an arc between the electrode and the slag bath.

The method may be carried out in any suitable furnace equipped with an electrode or electrodes adapted to be raised and lowered, such electrodes moving toward and into the slag. When using a plurality of electrodes the different electrodes are preferably adapted to be raised or lowered independently of each other. The electrode or electrdoes may be arranged vertically or they may be slanting. It is also possible to use pivotally mounted electrodes or electrodes movable in any other manner. The essential thing is that the surface of the electrode through which the electric current is supplied or led off, is adjustable into different positions in regard to the slag bath or to the molten metal, that is to say that the distance between the working part of the electrode and the molten metal may be varied. Furnaces of the Heroult type with all electrodes projecting from the top against or into the slag bath may thus be used. In some cases, it is more advantageous, for this method to use furnaces with a conducting bottom or a conducting bottom electrode, or bottom electrodes, so that operation with the current flowing from any one or some of the upper electrodes of the furnace to the bottom or the bottom electrodes, or vice versa, may take place, temporarily at least. By such an arrangement the temperature of the slag and the metal can easily be controlled at will, in that by connecting in a bottom electrode, for example, and by operating with resistance in the slag, the heat will be more concentrated downwards toward the metal.

The present method is particularly suitable in producing metal with a low percentage of carbon, when the charge fed into the furnace is prepared of finely crushed ore and finely crushed carbon or carbonaceous material, which substances are intimately mixed and made with or without the use of binding agents, into briquettes or other pieces with the particles of the reducing agents and the grains of the ore fixed with respect to their mutual positions, and which briquettes or pieces are then, if desired, subjected to drying or other means for solidification in air or other suitable atmosphere. In reducing a charge treated in this manner whilst swimming on the slag bath it has been found that regulating and controlling the temperature according to the method described, has entailed a considerable saving in electric current and that it has then been very easy to obtain the suitable temperature in the metal for tapping the same. The proper temperature in the metal, iron for instance, when tapping the same, has a very great influence on the quality of the iron or the steel either tapped in moulds or in the form of cast iron or cast steel respectively. The possibility of an effective control of the heat in the metal is therefore of considerable importance.

The example in the following paragraph will illustrate the manner in which the invention may be carried out for producing so called rustless iron.

Briquettes are prepared from a mixture of finely divided iron ore, finely divided chromium ore, finely divided charcoal and burnt lime used as lime white. The briquettes are fed into an electric furnace having electrodes capable of being raised and lowered and in which heat is thus developed by electric resistance through an air gap and through the slag bath, and reduced and melted in said furnace while swimming on the slag bath. During the main part of the reduction the furnace is run with the electrodes raised above the slag bath, thus with both arc and resistance, whereas a short time before tapping the electrodes are immersed in the slag in order to give the metal the high temperature necessary to tapping. The products obtained are of unusually high quality, having a high tenacity and good workability and the consumption of power and electrodes is very low on account of the control of the temperature during the smelting in accordance with the invention, especially in view of the high quality of the products obtained.

The invention is not limited to the metal or metals, nor to the binding agents or admixtures which have been mentioned hereinabove by way of example, but comprises production, with the optional use of any suitable binding agent in the manner set forth, of all metals capable of binding carbon and of the alloys thereof.

What we claim as new and desire to secure by Letters Patent of the United States of America is:—

1. An endothermic direct reduction process for producing carbon binding metals and metal alloys consisting in charging an electric furnace, having an electrode that can be raised and lowered and in which heat is thus developed by electric resistance in the slag bath, with a solidified mixture containing finely divided oxide ore and finely divided reducing agent in the proportion required for reduction of the ore and carbonization of the metal, reducing and melting said mixture whilst swimming on the slag bath, controlling the temperature of the slag bath and of the molten metal by supplying the heat, required for the reduction, to the upper layer of the slag bath through regulating the position of the electrode relatively to the slag bath and running with an arc between the electrode and the slag bath.

2. An endothermic direct reduction process for producing carbon binding metals and metal alloys consisting in charging an electric furnace, having an electrode that can be raised and lowered and in which heat is thus developed by electric resistance in the slag bath, with a solidified mixture containing finely divided oxide ore and finely divided reducing agent in the proportion required for reduction of the ore and carbonization of the metal, reducing and melting said mixture whilst swimming on the slag bath, and controlling the temperature of the slag bath and of the molten metal by supplying the heat, required for the reduction, to the upper layer of the slag bath through regulating the position of the electrode relatively to the slag bath, from a distance from the bath in the beginning to practically a contact therewith at the end of the reduction.

3. An endothermic direct reduction process for producing carbon binding metals and metal alloys consisting in charging an electric furnace in which heat is developed by electric resistance in the slag bath, with a solidified mixture containing finely divided oxide ore and finely divided reducing agent in the proportion required for reduction of the ore and carbonization of the metal, reducing and melting said mixture whilst swimming on the slag bath, by generating heat in consequence of a variable arc between an electrode and the slag bath and in consequence of the resistance of the slag bath, and increasing the temperature of the molten metal shortly before tapping through regulating the position of the electrode, so that it is kept as far down in the slag bath as possible without coming into contact with the molten metal.

4. An endothermic direct reduction process for producing metals and metal alloys low in carbon consisting in charging an electric electrode furnace with a mixture of finely divided ore and finely divided reducing agent in the proportion required for reduction of the ore and carbonization of the metal, reducing and melting said mixture while it floats upon the slag bath by developing heat at the surface of and within the slag bath by means of an adjustable electrode, and controlling the temperature of the slag bath and of the molten metal by regulating the distance between a point of the electrode and the surface of the slag bath.

5. In a process as defined in claim 4, increasing the temperature of the molten metal just before tapping by positioning the electrode as far down in the slag bath as possible without coming into contact with the molten metal.

In testimony whereof we affix our signatures.

HENNING GUSTAV FLODIN.
EMIL GUSTAF TORVALD GUSTAFSSON.